United States Patent
Girault et al.

(10) Patent No.: US 7,401,226 B2
(45) Date of Patent: Jul. 15, 2008

(54) PUBLIC KEY CRYPTOGRAPHIC METHOD BASED ON BRAID GROUPS

(75) Inventors: Marc Girault, Caen (FR); Jean-Francois Misarsky, Caen (FR); Patrick Dehornoy, Arnieres sur Iton (FR); Herve Sibert, Caen (FR)

(73) Assignee: France Telecom, Paris (FR)

( * ) Notice: Subject to any disclaimer, the term of this patent is extended or adjusted under 35 U.S.C. 154(b) by 784 days.

(21) Appl. No.: 10/492,894

(22) PCT Filed: Oct. 24, 2002

(86) PCT No.: PCT/FR02/03665

§ 371 (c)(1),
(2), (4) Date: Apr. 16, 2004

(87) PCT Pub. No.: WO03/036863

PCT Pub. Date: May 1, 2003

(65) Prior Publication Data

US 2004/0240672 A1    Dec. 2, 2004

(30) Foreign Application Priority Data

Oct. 25, 2001   (FR) .................................. 01 13787

(51) Int. Cl.
*H04L 9/00* (2006.01)

(52) U.S. Cl. ...................................... 713/180

(58) Field of Classification Search .................. 713/180
See application file for complete search history.

(56) References Cited

FOREIGN PATENT DOCUMENTS

EP       0 666 664       8/1995

OTHER PUBLICATIONS

K.H. Ho "New Public-Key Cryptosystem Using Braid Groups" Aug. 2000.*
Iris Anshel, et al., "An Algebraic Method for Public Key Cryptography", Mathematical Research Letters, vol. 6, pp. 1-5, 1999.
Iris Anshel et al., "New Key Agreement Protocols in Braid Group Cryptography", The Cryptographers' Track at RSA Conference 2001, Springer-Verlag, pp. 13-27, 2001.
Ki Hyoung Ko et al., "New-Public Key Cryptosystem Using Braid Groups", Advances in Cryptology, Crypto 2000, pp. 166-183, 2000.
Patrick Dehornoy, "A Fast Method for Comparing Braids", Advances in Mathematics, vol. 125, No. 2, pp. 200-235, Feb. 10, 1997.
Patrick Dehornoy, "L'art de tresser [The art of braiding]", Pour la Science; La science des neudes [The science of knots], pp. 68-75, 1997.
D. Epstein et al., "Word Processing in Groups", Jones and Barlett Publishers, pp. 181-209, 1988.

* cited by examiner

*Primary Examiner*—Gilberto Barrón, Jr.
*Assistant Examiner*—Devin Almeida
(74) *Attorney, Agent, or Firm*—Cohen Pontani Lieberman & Pavane LLP

(57) ABSTRACT

A public key cryptographic method based on groups of braids. The method employs a secret key defined by a representative s of a given braid S in a braid group G, a public key defined by a representative v of the braid T(S) converted from the braid S by an operator T, and an operation of verifying the equality of two braids, i.e. the equivalence of representatives of the two braids.

14 Claims, No Drawings

US 7,401,226 B2

PUBLIC KEY CRYPTOGRAPHIC METHOD BASED ON BRAID GROUPS

This is a U.S. National Phase Application under 35 USC 371 of International Application PCT/FR02/03665, filed on 24 Oct. 2002.

FIELD OF THE INVENTION

The present invention relates to a public key cryptographic method based on braid groups.

The invention finds a particularly advantageous application in the field of fast execution public key cryptographic methods, especially in environments with limited resources, such as standard microprocessor cards ("smart" cards), with or without contacts.

BACKGROUND OF THE INVENTION

In the field of public key cryptography, each user holds a pair of keys for a given use, the pair of keys comprising a secret key and an associated public key. In the case of a pair of keys dedicated to confidentiality, for example, the public key is used to encrypt the data and the secret key is used to decrypt it, i.e. to recover the data in clear. In contrast, in the case of a pair of keys dedicated to authentication, the secret key is used to calculate authentication values and the public key is used to verify the authentication values. Other uses are also possible, such as digital signatures and exchanging keys.

Public key cryptography is very useful in that, unlike secret key cryptography, it does not require the parties to share the same secret to set up secure communication. However, this advantage in terms of security goes hand in hand with a disadvantage in terms of performance, since public key cryptography methods (also known as public key schemes) are often a hundred or a thousand times slower than secret key cryptography methods (also known as secret key schemes). Finding fast execution public key cryptography methods that can be used in the environments with limited resources referred to above, such as microprocessor cards, is a very considerable challenge.

Most existing public key schemes rely on the difficulty of mathematical problems from the field of arithmetic or number theory. Thus the security of the RSA (Rivest, Shamir and Adleman) encryption and electronic signature scheme relies on the difficulty of the problem of factoring integers: given a large integer (i.e. one of more than 1000 bits) equal to the product of two or more prime factors of comparable size, there is no effective method of recovering the prime factors.

Other public key schemes, such as the electronic signature scheme described in French Patent No. 2 716 058, rely for their security on the difficulty of the discrete logarithm problem. All these schemes have the common feature of using basic operations in the form of operations on integers, such as modular multiplication: ab (modulo n), modular division: a/b (modulo n), or modular exponentiation: $a^b$ (modulo n), where a and b are integers.

The fact that most existing public key schemes rely on arithmetic has at least two drawbacks.

The first drawback is that, if the integers concerned have a length of a few hundred bits, the existence of efficient algorithms for solving the factoring problem and the discrete logarithm problem implies using very long integers (in particular very long keys), meaning 1000 bits or more at present. This leads to storage problems and especially to very long calculation times. Moreover, as the efficiency of these algorithms is increasing fairly rapidly as time passes, key lengths must be increased accordingly.

The second disadvantage is that it is risky to base the security of most secure applications on the difficulty of only two mathematical problems. This is especially true in that the two problems are similar, and it is entirely likely that the discovery of an efficient algorithm for solving one of them will be accompanied by the discovery of an efficient algorithm for solving the other.

This is why, for around the past fifteen years, much effort has been devoted to constructing public key cryptographic schemes that rely on problems other than those mentioned above and/or on mathematical objects other than integers. In particular, it has been proposed to replace operations on integers with operations on the points of so-called elliptical curves. The motivation for this is that the discrete logarithm problem seems even more difficult to solve in the case of elliptical curves, which reduce the lengths of keys without compromising the security of the schemes concerned.

However, using elliptical curves is only a partial solution to the two problems referred to hereinabove. This is because, even if elliptical curves are mathematical objects differing from and more complex than sets of integers, they remain relatively close thereto, in the sense that the theory that describes them is closely related to number theory. One tangible effect of this similarity is that the calculations to be applied to elliptical curves reduce to a succession of operations on integers similar to those defined above, even if the integers are smaller. A consequence of this is that calculation times remain too long.

For cryptographic purposes, it therefore remains necessary to use mathematical objects that are very different from those of number theory and the like, firstly to provide back-up solutions in the event of the discovery of efficient algorithms for solving the problems on which the above theories rely and, secondly, to provide solutions that are extremely efficient in terms of performance and in particular in terms of calculation time.

Attempts have been made in this direction. One of them (see K. H. Ko, S. J. Lee, J. H. Cheon, J. W. Han, J. Kang, and C. Park, *New Public-Key Cryptosystem Using Braid Groups*, Advances in Cryptology, LNCS 1880, pp. 166-183, Springer Verlag, August 2000) consists in using mathematical objects known as braid groups.

In the mathematical sense, a braid is a conceptualization and a generalization of the braid concept in the geometrical sense and in the ordinary use of the term. For more details on the theory of braids see the article by P. Dehornoy, *L'art de tresser* [The art of braiding], published in Pour la Science, pp. 68-75, of a special issue in 1997 entitled *La science des noeuds* [The science of knots].

The set of braids with n strands constitutes a group G, which has an internal composition law called a product which associates two braids X and Y with a braid XY resulting from the operation of attaching the braid Y under the braid X. As a general rule, the product of braids is not commutative. Moreover, with any braid with n strands there may be uniquely associated a permutation of the set $\{1, 2, \ldots, n\}$. A braid whose permutation is the identity permutation (which sends any integer from 1 to n to itself) is said to be pure.

The group G of braids with n strands has a neutral element E, represented by n unbraided strands, such that, for any braid X, the products EX and XE are both equal to X. Moreover, any braid X has an inverse $X^{-1}$ such that the products $XX^{-1}$ and $X^{-1}X$ are both equal to E.

The braids with n strands of the group G may be coded in various ways known as representations. To code a braid in a given representation, it is associated with one or more representatives. If X is a braid, x is a representative of X in the underlying representation. In the usual representations, such as those used by the present invention, if a braid X and a braid Y have respective representatives x and y, then there exists a simple operation on x and y whose result xy is a representative of the braid XY, and likewise there exists a simple operation on x whose result $x^{-1}$ is a representative of the braid $X^{-1}$.

The most widespread, so-called standard representation is based on the fact that any braid may be broken down into a product of (n−1) individual braids, each of which is denoted by a letter of an alphabet, and their inverses. Lowercase letters are used for the representatives of the individual braids. For example, in the case of braids with four strands, the three individual braids are denoted A, B and C, with the result that any braid X of the group may be expressed in a non-unique manner as a function of the braids A, B, C and their inverses $A^{-1}$, $B^{-1}$, $C^{-1}$. For example, the braids ABA and BAB are equal. Now aba and bab are equivalent braid representatives, i.e. they represent the same braid. Similarly, the braid B is equal to the braid $BBB^{-1}$, with the result that the representatives b and $bbb^{-1}$ are equivalent.

Other representations of the group G, referred to as alternative representations, may be employed. Thus a braid with n strands may be coded as a product of simple or canonic braids represented by permutations of $\{1, 2, \ldots, n\}$ and their inverses. There is also a representation of G known as the Birman-Ko-Lee representation, in which coding again uses permutations or certain tables of n numbers or from 1 to n, and another representation, known as the Dynnikov representation, in which coding is effected by means of integers. Once again a braid may have a plurality of representatives and representatives of the same braid are said to be equivalent.

In the standard representation, in which a braid is coded by words, the notation "~" means "equivalent to". The notation "u~v", in which u is a representative of the braid U and v is a representative of the braid V, means that the braids U and V are equal. The following relations of equivalence provide an exact way to determine if two words represent the same braid:

$aa^{-1} \sim a^{-1}a \sim e$, ac~ca if a and c are non-consecutive letters, aba~bab if a and b are consecutive letters.

The above-mentioned public key cryptography method using braids is dedicated exclusively to the confidentiality of data that is encrypted before transmission and then decrypted by the recipient.

SUMMARY OF THE INVENTION

One object of the present invention is to provide a public key cryptography method based on braid groups which not only ensures the confidentiality of the data but also the authentication of entities and/or data and additionally provides, at one and the same time, a high level of security and fast calculation times, compatible with application of the method to systems with limited power resources, such as microprocessor cards.

This and other objects are attained in accordance with one aspect of the present invention directed to a public key cryptographic method based on groups of braids. The method employs a secret key defined by a representatives of a given braid S in a braid group G, a public key defined by a representative v of the braid T(S) converted from the braid S by an operator T, and an operation of verifying the equality of two braids, i.e. the equivalence of representatives of said two braids.

DETAILED DESCRIPTION OF THE PREFERRED EMBODIMENT

It is therefore clear that the security of the cryptographic method of the invention relies on the difficulty of reconstituting the secret braid S from the representative v of T(S) contained in the public key, such reconstitution cumulatively encountering the problem of the equality of braids, and therefore of the equivalence of representatives, and that of the inversion of the operator T. In this sense, two examples of the operator T are proposed that are suited to implementation of the method of the invention:

the operator T is defined by $T(S)=SWS^{-1}$, where W is a braid of a group G and a representative w of which forms said public key with the representative v of the braid V=T(S) and $S^{-1}$ is the inverse braid of the braid S in the group G, the operator T is defined by a positive integer p not less than 2 and by $T(S)=S^p=S \ldots S$, the product of S multiplied by itself p times.

The first operator uses the problem of conjugation, which is considered to be extremely difficult: knowing a representative of the braid $SWS^{-1}$, it is a matter of finding a representative of the braid S. In particular, the use of reduced forms, which are privileged braid representatives, makes this problem particularly insoluble. The same applies to the root problem used in the second operator: finding a representative of S knowing a representative of $S^p$ is in practice impossible.

Moreover, the braid representative equivalence verification operation is accelerated if it uses a reduced form of the representatives of said braids or the reduced form of representatives of braids calculated from said braids. The benefit of these reduced forms, which are functions that convert one braid representative into another (possibly identical) representative of the same braid, is that they provide efficient methods for solving the problem of knowing if two braids are equal, on the basis of representatives of said braids, which is not a priori a trivial problem.

A reduced form FR is characterized by the fact that it converts any representative of the neutral braid E into a trivial (i.e. empty) representative e. However, two representatives of the same braid do not necessarily have the same reduced form. This applies to the reduced form developed by P. Dehornoy in *A Fast Method for Comparing Braids*, Advances in Mathematics, No. 125, pp. 200-235, 1997. To determine if two representatives u and v of braids U and V are equivalent, the reduced form of $uv^{-1}$, which is a representative of the braid $UV^{-1}$, is calculated. Indeed, to state that u and v are equivalent or that $uv^{-1}$ represents the trivial braid E amounts to the same thing. Thus u and v are equivalent if and only if $FR(uv^{-1})=e$. An alternative is to use $u^{-1}v$ instead of $uv^{-1}$.

One particular instance of reduced forms is normal forms. A normal form FN is a reduced form which associates the same representative of a braid with any two representatives of the same braid. In other words, two braid representatives u and v are equivalent if and only if they have the same normal form FN(u)=FN(v). A number of ways of defining a normal form FN are described in the prior art and in particular in D. Epstein et al., *Word Processing in Groups*, Jones and Barlett Publishers, Boston, 1988. Certain normal forms may be calculated efficiently, in particular in the case of alternative representations of the braid group described above: the representatives of the braids then lend themselves to the calculation of normal forms in particular.

However, in the case of the standard representation, using a reduced form yields more efficient algorithms, because the requirements in respect of a reduced form are weaker than those in respect of a normal form, two equivalent representatives not necessarily having the same reduced form, whereas they necessarily have the same normal form. Thus the algorithm for calculating a reduced form cited hereinabove is faster than any prior art algorithm for calculating a normal form in the case of the standard representation. Clearly then, depending on the choice of representation, there would be an advantage in using the cryptographic method of the invention on some occasions with a reduced form FR that is not necessarily normal (typically in the standard representation) and sometimes with a reduced form FN that is normal (in particular in alternative representations).

Note that the fact that a reduced form is not necessarily unique for a given braid is not a drawback if a decision to be taken depends only on whether two words are equivalent or not; for example "Is the entity with which one is communicating authentic or not?".

Four examples of applications of the cryptographic method of the invention are described in detail below. All these examples relate to authentication protocols, but this is not limiting on the invention.

Similarly, and as already mentioned, although this is not indispensable, reduced forms FR that are not necessarily normal forms are used throughout, given that they constitute the preferred embodiment of the invention.

The first authentication protocol involves a group G1 of braids with n=p+q strands and the conjugation problem. To be more precise, two braids of a particular type are involved: one uses only the p left-hand braids, and may be coded in the standard representation by means of the first p−1 letters and their inverses in an alphabet with n=p+q letters; the other uses only the q right-hand strands, and consequently may be coded in the standard representation with the aid of the last q−1 letters of that alphabet and their inverses. Two such braids have the feature of commutating one with the other, in contradistinction to the general case.

The secret key of the prover A is a representative s of a braid S with p left-hand strands. The public key of the prover A, used by the verifier B, is a pair (v, w) comprising a representative w of a braid W selected from the group G1 and a representative v of the braid $V=T(S)=SWS^{-1}$.

The prover A is authenticated by the verifier B in the following manner, by means of two exchanges:
1. B selects a braid Z with q right-hand strands, by selecting a representative z. B then holds a representative $zwz^{-1}$ of the braid $C=ZWZ^{-1}$. B calculates a representative $c=F1(zwz^{-1})$ of C, and sends c to A.
2. A calculates a representative $y=F2(scs^{-1})$ of the braid $SCS^{-1}$ and sends y to B. B verifies the equivalence $y \sim zvz^{-1}$ using a reduced (where applicable normal) form FR.

The fact that y is equivalent to $zvz^{-1}$ results from the fact that S and Z commute with each other; in fact, y represents the braid $SCS^{-1}$, in other words: $S(ZWZ^{-1})S^{-1}=(SZ)W(Z^{-1}S^{-1})=(ZS)W(S^{-1}Z^{-1})=Z(SWS^{-1})Z^{-1}=ZVZ^{-1}$, which is also represented by $zvz^{-1}$.

The equivalence formulated in step 2 may be verified, non-exclusively, by verifying the equality $FR(yzv^{-1}z^{-1})=e$ or, if a normal form is used, $FN(y)=FN(zvz^{-1})$.

The functions F1 and F2 associate a representative of a braid with a representative of the same braid. In the case of the standard representation, F1 and F2 may be reduced forms, but this is not necessarily the case. They are typically reduced forms, generally other than that used for the equivalence verification. In the case of alternative representations, the normal form FN is used for F1 and F2.

A pure braid is preferably selected for W.

Variants of the above protocol may easily be specified. In particular, a representative of the braid $T'(S)=S^{-1}WS$ may be selected for v and the remainder of the protocol modified accordingly. Then again, a braid on the q right-hand strands may be selected for S and a braid on the p left-hand strands may be selected for Z.

The second authentication protocol uses a group G2 of braids with n strands and the conjugation problem. It consists in iterating k times a basic protocol with three exchanges, the protocol itself offering only one chance in two of detecting a possible impostor, i.e. an entity C who does not know the secret of A but is attempting to pass itself off as A. After k iterations, an impostor has only one chance in $2^k$ of not being detected. This protocol comes from the category of zero-knowledge protocols.

The secret key of the prover A is a representative s of a braid S of the group G2. The public key of the prover A, used by the verifier B, is a pair (v, w) comprising a representative w of a braid W selected in the group G2 and a representative v of the braid $V=T(S)=SWS^{-1}$.

The prover A is authenticated by the verifier B in the following manner, in three exchanges iterated k times:
1. A selects a braid R, by selecting a representative r. A then holds a representative $rwr^{-1}$ of the braid $X=RWR^{-1}$. A calculates a representative $x=F1(rwr^{-1})$ of X, and sends x to B.
2. B draws a bit c at random and sends c to A.
3a. If c=0, A sets y=r and sends y to B. B verifies the equivalence $x \sim ywy^{-1}$ using a reduced (where applicable normal) form FR.
3b. If c=1, A calculates a representative $y=F2(rs^{-1})$ of the braid $RS^{-1}$ and sends y to B. B then verifies the equivalence $x \sim yvy^{-1}$ using a reduced (where applicable normal) form FR.

In fact, if c=1, x and $yvy^{-1}$ are equivalent since $yvy^{-1}$ represents the braid $(RS^{-1})SWS^{-1}(SR^{-1})=R(S^{-1}S)W(S^{-1}S)R^{-1}=RWR^{-1}$, of which x is a representative.

The equivalence formulated in step 3a may be verified, non-exclusively, by verifying the equality $FR(xyw^{-1}y^{-1})=e$ or, if a normal form is used, $FN(x)=FN(ywy^{-1})$.

The equivalence formulated in step 3b may be verified, non-exclusively, by verifying the equality $FR(xyv^{-1}y^{-1})=e$ or, if a normal form is used, $FN(x)=FN(yvy^{-1})$.

The functions F1 and F2 associate a representative of a braid with a representative of the same braid. In the case of the standard representation, F1 and F2 may be reduced forms, but this is not necessarily the case. They are typically reduced forms, generally other than that used for the equivalence verification. In the case of alternative representations, F1 and F2 preferably take the normal form FN.

Variants of the above protocol may easily be specified. In particular, a representative of the braid $T'(S)=S^{-1}WS$ may be selected for v and the remainder of the protocol modified accordingly.

The third authentication protocol uses a group G3 of braids with n strands and the conjugation problem. Like the preceding one, this protocol is from the category of zero-knowledge protocols, three exchanges being iterated k times.

The secret key of the prover A is a representative s of a braid S of the group G3. The public key of the prover A, used by the verifier B, is a pair (v, w) comprising a representative w of a braid W selected in the group G3 and a representative v of the braid $V=T(S)=SWS^{-1}$.

The prover A is authenticated by the verifier B in the following manner, in three exchanges iterated k times:

1. A selects a braid R, by selecting a representative r. A then holds a representative $rwr^{-1}$ of the braid $X=RWR^{-1}$ and a representative $rvr^{-1}$ of the braid $X'=RVR^{-1}$. A calculates a representative $x=F1(rwr^{-1})$ of X and a representative $x'=F'1(rvr^{-1})$ of X', and sends x and x' to B.
2. B draws a bit c at random and sends c to A.
3a. If c=0, A sets y=r and sends y to B. B verifies the equivalences $x \sim ywy^{-1}$ and $x' \sim yvy^{-1}$ using a reduced (where applicable normal) form FR.
3b. If c=1, A calculates a representative $y=F2(rsr^{-1})$ of the braid $RSR^{-1}$ and sends y to B. B then verifies the equivalence $x \sim yxy^{-1}$ using a reduced (where applicable normal) form FR.

In fact, if c=1, x' and $yxy^{-1}$ are equivalent since $yxy^{-1}$ represents the braid: $(RSR^{-1})RWR^{-1}(RS^{-1}R^{-1})=RS(R^{-1}R) W(R^{-1}R)S^{-1}R^{-1}=R(SWS^{-1})R^{-1}=RVR^{-1}$, of which x' is a representative.

The equivalence formulated in step 3a may be verified, non-exclusively, by verifying the equalities $FR(xyw^{-1}y^{-1})=e$ and $FR(x'yv^{-1}y^{-1})=e$ or, if a normal form is used, $FN(x)=FN(ywy^{-1})$ and $FN(x)=FN(yvy^{-1})$ The equivalence formulated in step 3b may be verified, non-exclusively, by verifying the equalities $FR(x'yx^{-1}y^{-1})=e$ or, if a normal form is used, $FN(x')=FN(yxy^{-1})$.

The functions F1, F'1 and F2 associate a representative of a braid with a representative of the same braid. In the case of the standard representation, F1, F'1 and F2 may be reduced forms, but this is not necessarily the case. They are typically reduced forms, generally other than that used for the equivalence verification. In the case of alternative representations, F1, F'1 and F2 preferably take the normal form FN.

Note that the property used in the verification is the fact that the conjugation is auto-distributive. An operation * is auto-distributive if the following is true: $u*(v*w)=(u*v)*(u*w)$. Thus the conjugation operation could be replaced in this protocol by another auto-distributive operation.

The fourth authentication protocol uses a group G4 of braids with n strands and, simultaneously, the $p^{th}$ root problem and the conjugation problem. This protocol is from the category of zero-knowledge protocols in the sense of the preceding two protocols.

The secret key of the prover A is a representative s of a braid S of the group G4. The public key of the prover A, used by the verifier B, is a representative v of the braid $V=S^p=S \ldots S$, the product of S by itself iterated p times, where p is a small integer greater than or equal to 2.

The prover A is authenticated by the verifier B in the following manner, in three exchanges iterated k times:
1. A selects a braid R, by selecting a representative r. A then holds a representative $rvr^{-1}$ of the braid $X=RVR^{-1}$. A calculates a representative $x=F1(rvr^{-1})$ of X and sends x to B.
2. B draws a bit c at random and sends c to A.
3a. If c=0, A sets y=r and sends y to B. B verifies the equivalence $x \sim yvy^{-1}$ using a reduced (where applicable normal) form FR.
3b. If c=1, A calculates a representative $y=F2(rsr^{-1})$ of the braid $RSR^{-1}$ and sends y to B. B then verifies the equivalence $x \sim y^{-p}$ using a reduced (where applicable normal) form FR.

In fact, if c=1, x and $y^p$ are equivalent since $y^p$ represents the braid $(RSR^{-1})^p=RS^pR^{-1}=RVR^{-1}$, of which x is a representative.

The equivalence formulated in step 3a may be verified, non-exclusively, by verifying the equality $FR(xyv^{-1}y^{-1})=e$ or, if a normal form is used, $FN(x)=FN(yvy^{-1})$.

The equivalence formulated in step 3b may be verified, non-exclusively, by verifying the equality $FR(xyv^{-1} \ldots y^{-1})=e$ (y$^{-1}$ being iterated p times) or, if a normal form is used, $FN(v)=FN(y \ldots y)$ (y being iterated p times).

The functions F1 and F2 associate a representative of a braid with a representative of the same braid. In the case of the standard representation, F1 and F2 may be reduced forms, but this is not necessarily the case. They are typically reduced forms, generally other than that used for the equivalence verification. In the case of alternative representations, F1 and F2 preferably take the normal form FN.

The invention claimed is:

1. A cryptographic authentication method based on groups of braids, comprising the steps of:
   providing a prover with a secret key defined by a first representative of a given braid S in a braid group;
   providing the prover with a public key defined by a second representative of a braid T(S);
   sending at least a predefined representative of a first braid from the prover to a verifier;
   checking, at the verifier, at least equivalence between the predefined representative of the first braid and a predefined representative of a second braid; and
   authenticating the prover at the verifier if at least the equivalence between the predefined representative of the first braid and the predefined representative of the second braid is verified;
   wherein S is the braid and T is a predefined operator acting on the braid.

2. The cryptographic method according to claim 1, wherein the second representative is a reduced form of the second representative of the braid.

3. The cryptographic method according to claim 1, wherein said operation of verifying the equivalence of representatives of two braids is performed using one of a reduced form of representatives of said braids and the reduced form of representatives of braids calculated from said braids.

4. The cryptographic method according to claim 2, wherein said reduced form is a normal form.

5. The cryptographic method according to claim 2, wherein said reduced form is a non-normal reduced form.

6. The cryptographic method according to claim 1, wherein T is in accordance with the relationship $T(S)=SWS^{-1}$, where W is a braid of the braid group and a representative of which forms said public key with the second representative of the braid and $S^{-1}$ is an inverse braid of the given braid in the braid group.

7. The cryptographic method according to claim 1, wherein $T(S)=S^p=S \ldots S$, the product of S multiplied by itself p times, and p is a positive integer.

8. The cryptographic method according to claim 6, wherein, for authentication of the prover by the verifier:
   the prover is assigned a secret key comprising a representative s of the given braid S with p left-hand strands selected from a group G1 of braids with n=p+q strands,
   the prover is assigned a public key, used by the verifier, comprising a representative of the braid of the braid group W selected from the group of braids G1 and a representative v of the braid $V=T(S)=SWS^{-1}$,
   the verifier, selects in the group of braids G1 a braid Z with q right-hand strands by selecting a representative z, calculates a representative c of the braid $C=ZWZ^{-1}$, and sends c to the prover,
   the prover calculates a representative y of the braid $Y=SCS^{-1}$ and sends y to the verifier, and
   the verifier verifies the equivalence of the representatives y and $zvz^{-1}$.

9. The cryptographic method according to claim 6, wherein, for authentication of the prover by the verifier:
- the prover is assigned a secret key comprising a representative s of the given braid S selected from a group G2 of braids with n strands,
- the prover is assigned a public key, used by the verifier, comprising a representative w of a braid W selected from the group G2 and a representative v of the braid $SWS^{-1}$,
- the prover selects a braid R in the group G2 by selecting a representative r, calculates a representative x of the braid $X=RWR^{-1}$, and sends x to the verifier,
- the verifier selects a bit c and sends c to the prover,
  - if c=0, the prover sets y=r and sends y to the verifier, which verifies the equivalence of the representatives x and $ywy^{-1}$,
  - if c=1, the prover calculates a representative y of the braid $RS^{-1}$ and sends y to the verifier, which verifies the equivalence of the representatives x and $yvy^{-1}$,
- wherein a last three exchanges are iterated k times.

10. The cryptographic method according to claim 6, wherein, for authentication of the prover by the verifier:
- the prover is assigned a secret key comprising a representative s of a braid S selected from a group G3 of braids with n strands,
- the prover is assigned a public key, used by the verifier, comprising a representative w of a braid W selected from the group G3 and a representative v of the braid $SWS^{-1}$,
- the prover selects a braid R in the group G3 by selecting a representative r, calculates a representative x of the braid $X=RWR^{-1}$, calculates a representative x' of the braid $X'=RWR^{-1}$, and sends x and x' to the verifier B,
- the verifier selects a bit c and sends c to the prover,
  - if c32 0, the prover sets y=r and sends y to the verifier, which verifies the equivalence of the representatives x and $ywy^{-1}$ and that of the representatives x' and $yvy^{-1}$,
  - if c=1, the prover calculates a representative y of the braid $RSR^{-1}$ and sends y to the verifier, which verifies the equivalence of the representatives x' and $yxy^{-1}$,
- wherein a last three exchanges are iterated k times.

11. The cryptographic method according to claim 7, wherein, for authentication of the prover by the verifier:
- the prover is assigned a secret key comprising a representative s of a braid selected from a group G4 of braids with n strands,
- the prover is assigned a public key, used by the verifier, comprising a representative v of a braid $V=S^p=S\ldots S$, product of S p times, p being an integer greater than or equal to 2,
- the prover selects a braid in the group G3 by selecting a representative r, calculates a representative x of the braid in accordance with the relationship $X=RVR^{-1}$, and sends x to the verifier,
- the verifier selects a bit c and sends c to the prover,
  - if c=0, the prover sets y=r and sends y to the verifier, which verifies the equivalence of the representatives x and $yvy^{-1}$,
  - if c=1, the prover calculates a representative y of the braid $RSR^{-1}$ and sends y to the verifier, which verifies the equivalence of the representatives x and $y^p=y\ldots y$, the representative of the braid $Y^p$ obtained from y,
- wherein a last three exchanges are iterated k times.

12. The cryptographic method according to claim 6, wherein T is replaced by an auto-distributive operation.

13. The cryptographic method according to claim 8, wherein said braid of the braid group is pure.

14. The cryptographic method according to claim 1, wherein the equivalence between the predefined representative of the first braid and the predefined representative of a second braid occurs when the first braid and the second braid are equal.

* * * * *